Sept. 1, 1925.

J. B. LARKIN

CHECK RECORD

Filed Dec. 27, 1923

INVENTOR
Joseph B Larkin
John A. Naismith
BY
ATTORNEY

Patented Sept. 1, 1925.

1,551,754

UNITED STATES PATENT OFFICE.

JOSEPH B. LARKIN, OF PALO ALTO, CALIFORNIA.

CHECK RECORD.

Application filed December 27, 1923. Serial No. 683,017.

*To all whom it may concern:*

Be it known that I, JOSEPH B. LARKIN, a citizen of the United States, and a resident of Palo Alto, in the county of Santa Clara and State of California, have invented certain new and useful Improvements in Check Records, of which the following is a specification.

It is the object of my invention to provide a device wherein a check and a duplicate thereof are simultaneously punched at corresponding indicia, one check being detached for delivery to the customer and the other being retained in the device in such a manner as to provide an accurate record of all checks disbursed.

In the drawing:—

Figure 1:
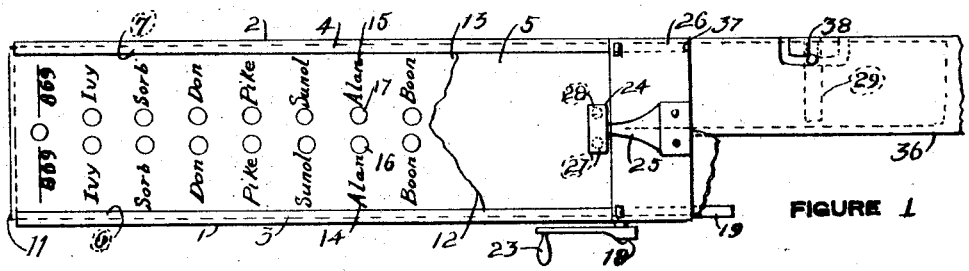
Figure 1 is a plan view of the device.
Figure 2:
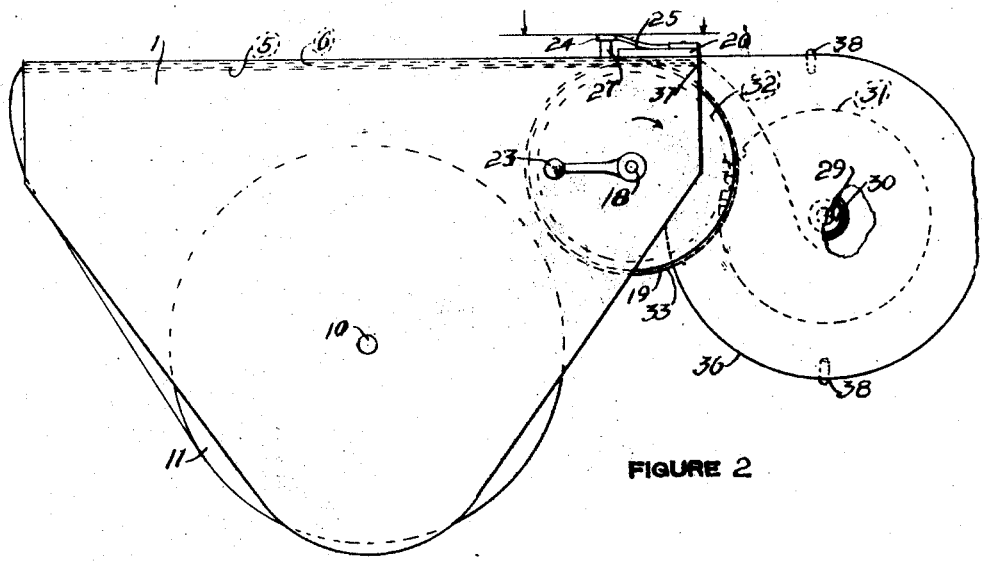
Figure 2 is a side elevation of the same.
Figure 4:
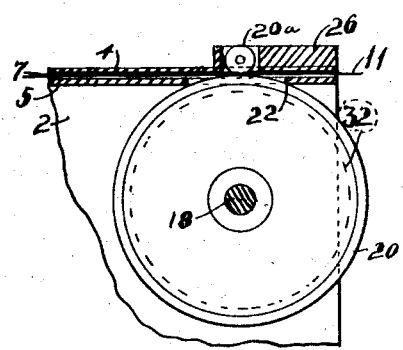
Figure 4 is an enlarged section on 4—4, Figure 1.
Figure 6:
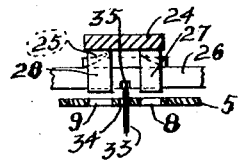
Figure 6 is an enlarged section on 6—6, Figure 1.
Figure 5:
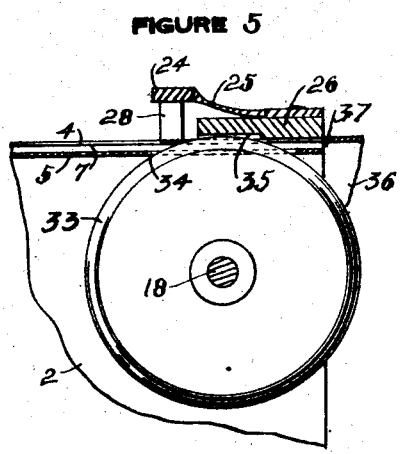
Figure 5 is an enlarged section on 5—5, Figure 1.
Figure 3:
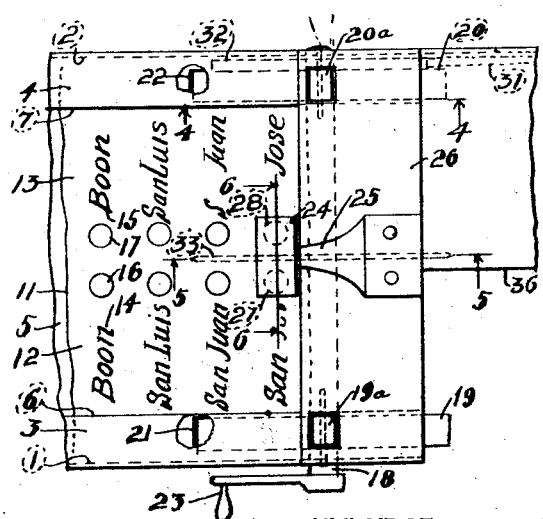
Figure 3 is an enlarged plan view on 3—3 of Figure 1.

Referring more particularly to the drawing, I show a case comprising two side portions 1 and 2 having inwardly turned upper edges to form flanges 3 and 4 respectively.

Plates 1 and 2 are supported and spaced at their upper edges by check supporting plate 5, this plate being spaced slightly below the flanges 3—4 to form grooves 6—7, and having laterally spaced orifices 8 and 9 formed therein near one end as shown.

The side portions 1 and 2 have a shaft 10 passing therethrough carrying a roll of paper 11 having duplicate rows of consecutively numbered checks printed thereon as at 12—13, the outer end of the roll being inserted in grooves 6—7 at one end and passing therethrough to the opposite end over the orifices 8—9 in plate 5.

In the present case the checks are designed for use on automobile bus lines, a device being mounted near the driver of each automobile and consequently each check has printed thereon, in their proper order, the names of the several points at which passengers are taken on in his run, as indicated at 14—15. Adjacent to each name is marked a circle as at 16—17 the same size as the orifices 8—9 in plate 5, these circles being so placed as to pass directly over the said orifices as the strip is advanced through the grooves.

To advance the strip through the device, I provide a shaft 18 revolubly mounted in side portions 1—2 and carrying wheels 19—20 provided with rubber rims, these wheels being sufficiently large to pass through grooves 21—22 in plate 5 and engage the under surfaces of the paper strip passing thereover and press it up against the under side of rollers 19ª—20ª set in bar 26. By revolving shaft 18, therefore, in the direction indicated by the arrow, by means of handle 23, the strip is moved forwardly as desired, the corresponding circles 16—17 of the two parallel rows of circles registering with the two orifices 8—9 at exactly the same time.

Any suitable means may be provided for simultaneously punching the two strips. In the present instance I have shown a bar 24 mounted for vertical movement on spring element 25, this element being mounted on bar 26 mounted on the forward end of the device and transversely thereof as shown. Upon the underside of bar 24 are arranged punches 27—28 in axial alignment with orifices 8—9. A momentary pressure on bar 24 will punch both rows of tickets at the same time, the spring element 25 returning the punches to an inoperative position when released.

In order to preserve one row or strip of checks on paper strip 11, the side plate 2 is extended forwardly a distance and provided with a fixed shaft 29 which carries a spool 30, the said spool carrying a sprocket 31 meshing with a similar sprocket 32 on shaft 18. When shaft 18 is rotated, therefore, to advance the strip as described, the spool 30 is automatically rotated therewith. Mounted on the center of shaft 18 to rotate therewith is a disc knife 33 passing through slot 34 in plate 5 and into a groove 35 in the under side of bar 26. The knife 33, therefore, lies in the path of travel of the paper strip 11 and severs it into two equal parts as it passes through and out of the device. A cap 36 is fitted over the rewinding mechanism described and is provided with an opening at 37 to permit the entrance of check strip 13. An interlocking pin and slot device is provided at 38—38 to secure the cap in position.

The device being set for use by the driver of an automobile operating over a given line, he punches the checks at the point the fare is received by pressing down on bar 24, and also punches the same checks for the destination, the circles opposite the names of the said points being moved into position by turning handle 23. As the strip 11 is advanced the two strips of checks are positively separated by cutting disc 33, the punched check from strip 12 being torn off by the driver and given to the passenger, and the other check similarly punched being rewound on spool 30 to be later inspected by the office in checking up on the fares received for the run.

It is to be understood, of course, that while I have herein shown and described a certain preferred embodiment of the invention, changes in form, construction, and method of operation may be made within the scope of the appended claims.

I claim:

1. A device of the character indicated comprising a holder for a plurality of strips of tickets having indicia thereon and joined along their opposed longer edges to form an integral whole, means for advancing said strips through said holder, means for mutilating corresponding points on corresponding tickets of said strips, and means for separating said strips as they are advanced through said holder.

2. A device of the character indicated comprising a holder for a plurality of strips of tickets having indicia thereon and joined along their opposed longer edges to form an integral whole, means for advancing said strips through said holder, means for mutilating corresponding points on corresponding tickets of said strips, and a cutting edge arranged in the path of travel of said strips whereby to separate one from the other.

3. A device of the character described, comprising a holder, means for advancing a strip thereover, and means movable with the advancing means for severing the strip longitudinally.

4. A device of the character described, comprising a holder, spaced means for advancing a strip thereover, and means arranged between the spaced means for longitudinally dividing the strip by and during movement of the advancing means.

5. A device of the character described, comprising a holder, spaced means for advancing a strip thereover, means arranged between the spaced means for longitudinally dividing the strip by and during movement of the advancing means, and a compartment in line with one portion of the strip for receiving said portion, the companion divided portion extending freely from the holder for being readily grasped and severed.

6. A device of the character described, comprising a holder, spaced feed wheels for advancing a strip thereover, and a rotary cutter between the wheels and movable therewith for longitudinally dividing the strip.

7. A device of the character described, comprising a holder, means for advancing a strip thereover, means for longitudinally dividing the strip as fed, and means for marking the strip prior to being divided and at spaced points on opposite sides of the line of division.

JOSEPH B. LARKIN.